(12) United States Patent
Takakura

(10) Patent No.: US 7,619,850 B2
(45) Date of Patent: Nov. 17, 2009

(54) MAGNETIC DISK APPARATUS AND MAGNETIC HEAD CONTROL METHOD

(75) Inventor: Shinji Takakura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 72 days.

(21) Appl. No.: 12/052,273

(22) Filed: Mar. 20, 2008

(65) Prior Publication Data
US 2009/0040647 A1 Feb. 12, 2009

(30) Foreign Application Priority Data
Aug. 8, 2007 (JP) ............................. 2007-207149

(51) Int. Cl.
*G11B 5/596* (2006.01)
(52) U.S. Cl. ................... 360/78.09; 360/78.04
(58) Field of Classification Search ............... 360/78.09
See application file for complete search history.

(56) References Cited

U.S. PATENT DOCUMENTS 6,347,018 B1 * 2/2002 Kadlec et al. ............ 360/77.08
7,394,613 B2 * 7/2008 Takaishi ................... 360/78.09

FOREIGN PATENT DOCUMENTS

JP 09-073618 3/1997

OTHER PUBLICATIONS

Yatsu, et al., Seek Control Method of Hard Disk Drives Using Model Following Control, The 74th JSME Spring Annual Meeting No. 4, pp. 410-411, 1997.

* cited by examiner

*Primary Examiner*—Andrew L Sniezek
(74) *Attorney, Agent, or Firm*—Turocy & Watson, LLP

(57) ABSTRACT

A magnetic disk apparatus includes: a driving unit; and control part configured to control the driving unit. The control part includes: a position error feedback control system and a two-degree-of-freedom control system. The position error feedback control system has an integrator and a phase-lead compensator and is operative to determine a position command based on a target position and a sensed position of the magnetic head, thereby performs feedback control on the driving unit. The two-degree-of-freedom control system receives as input a target moving distance of the magnetic head and outputs a current command to the driving unit by using a mathematical model of the driving unit. The control part updates the mathematical model, and has a first update mode in which the mathematical model is updated using the output of the phase-lead compensator while the output of the integrator is provided to the driving unit.

20 Claims, 13 Drawing Sheets

— (SOLID LINE): PERIOD OF PHASE-LEAD COMPENSATOR 120
- - - - (DASHED LINE): PERIOD OF MODEL-SIDE CONTROL SYSTEM 200

| REMAINING DISTANCE 10 CYLINDERS OR LESS | REMAINING DISTANCE 11~30 CYLINDERS OR LESS | REMAINING DISTANCE 31~70 CYLINDERS OR LESS | REMAINING DISTANCE 71~100 CYLINDERS OR LESS | 101 OR MORE |
|---|---|---|---|---|
| CONNECT SWITCH sw1 TO TERMINAL 2 | $L=[0.85\ 0.85]^T$ | $L=[0.75\ 0.75]^T$ | $L=[0.5\ 0.5]^T$ | $L=[0.3\ 0.3]^T$ |

MAGNETIC DISK APPARATUS AND MAGNETIC HEAD CONTROL METHOD

CROSS-REFERENCE TO RELATED APPLICATIONS

This application is based upon and claims the benefit of priority from the prior Japanese Patent Application No. 2007-207149, filed on Aug. 8, 2007; the entire contents of which are incorporated herein by reference.

BACKGROUND OF THE INVENTION

1. Field of the Invention

This invention relates to a magnetic disk apparatus and a magnetic head control method in which a magnetic head is moved above a rotating magnetic disk.

2. Background Art

The magnetic head positioning control system of a magnetic disk apparatus is typically configured as a digital control system based on a microcomputer. More specifically, discretely obtained position information of the magnetic head is used to calculate a control command in a microprocessor, and the control command is provided to a drive of an actuator through a D/A (digital-to-analog) converter. In general, an actuator has mechanical resonance in a high-frequency band. Hence, to move the magnetic head to a target position with high velocity, low vibration, and low sound noise, it is very important to generate a feedforward control input that does not excite mechanical resonance.

A possible method for rapidly moving a magnetic head for a short distance is to use an optimization technique in previously calculating a feedforward control input to the actuator, which is designed to avoid excitation of mechanical resonance, and a target position command for a feedback control system, and to maintain them as a table. However, such a method is impracticable for covering all the seek distances in view of the memory capacity of the microprocessor. Hence, for a long-distance seek, the feedforward control input to the actuator and the target position command need to be generated online.

In a possible method for this purpose, an actuator model provided in a control system is used to cause a model velocity to follow a target velocity curve so that a control command for the model and a model position are provided to the feedback control system as a feedforward control input to the actuator and a target position command, respectively (e.g., JP-A 9-073618A (Kokai). However, in the head positioning control system disclosed in JP-A 9-073618A (Kokai), the magnetic head unfortunately undergoes overshoot at the settling time unless the position and velocity of the model are close to the actual position and velocity of the magnetic head. Hence some model correction is required during the seek.

In a method for this purpose, during the first half of the seek, the model is updated by applying the feedback control output to the input of the model, the position and velocity of the magnetic head are predicted by the model, and the predicted position and velocity of the model are used to construct a velocity control system (e.g., Proceedings of JSME (Japan Society of Mechanical Engineers) 74th General Meeting, vol. 4, pp. 410-411 (1997) FIG. 3). Furthermore, in this method, during the second half of the seek in which the magnetic head is close to the target position, the feedback control output is switched to the actuator to construct an ordinary two-degree-of-freedom control system.

However, in the case where construction of a servo system is required as in a magnetic disk apparatus, the feedback controller includes an integrator. Hence, when such a seek control system is constructed, the output of the integrator is also applied to the model. Thus, under large external force such as magnetic latching force, the output of the integrator increases. Hence the control command unfortunately produces a transient response upon switching to the ordinary two-degree-of-freedom control system.

Furthermore in the case of a magnetic disk apparatus, when the magnetic head moves rapidly, it obliquely traverses the servo pattern, increasing the position sensing noise. The position sensing noise affects the model-side velocity feedback control system through the feedback control output. Hence, unfortunately, an oscillatory feedforward control command is produced, and also causes sound noise. For these reasons, in a control system such as those described in JP-A 9-073618A (Kokai) and Proceedings of JSME (Japan Society of Mechanical Engineers) 74th General Meeting, vol. 4, pp. 410-411 (1997), it is difficult to realize robust seek control under an environment subjected to large external force. Furthermore, it is also difficult to reduce the effect of position sensing noise.

SUMMARY OF THE INVENTION

According to an aspect of the invention, there is provided a magnetic disk apparatus including: a driving unit configured to move a magnetic head operative to record and reproduce information on a magnetic disk; and control part configured to control the driving unit, the control part including: a position error feedback control system having an integrator and a phase-lead compensator and being operative to determine a position command based on a target position and a sensed position of the magnetic head, thereby performing feedback control on the driving unit; and a two-degree-of-freedom control system configured to receive as input a target moving distance of the magnetic head and to output a current command to the driving unit by using a mathematical model of the driving unit, and the control part updating the mathematical model, and having a first update mode in which the mathematical model is updated using the output of the phase-lead compensator while the output of the integrator is provided to the driving unit.

According to another aspect of the invention, there is provided a magnetic disk apparatus including: a driving unit configured to move a magnetic head operative to record and reproduce information on a magnetic disk; and control part configured to control the driving unit, the control part including: a position error feedback control system having an integrator and a phase-lead compensator and being operative to determine a position command based on a target position and a sensed position of the magnetic head, thereby performing feedback control on the driving unit; a two-degree-of-freedom control system configured to receive as input a target moving distance of the magnetic head and to output a current command to the driving unit by using a mathematical model of the driving unit; a first switch having a first state and a second state, an output of the phase-lead compensator being provided to the driving unit in the first state, and the output of the phase-lead compensator being provided to the mathematical model in the second state; and a second switch having a third state and a fourth state, an output of the integrator being provided to the driving unit in the third state, and the output of the integrator being provided to the mathematical model in the fourth state.

According to another aspect of the invention, there is provided a magnetic head control method for moving a magnetic head operative to record and reproduce information on a magnetic disk, the method including: using an integrator and a phase-lead compensator to determine a position command based on a target position and a sensed position of the magnetic head, thereby performing feedback control on a driving unit for the magnetic head; simultaneously, receiving as input a target moving distance of the magnetic head and using a mathematical model of the driving unit to output a current command to the driving unit, thereby controlling the driving unit; and updating the mathematical model, the method having a mode in which the mathematical model is updated using the output of the phase-lead compensator while the output of the integrator is provided to the driving unit.

DETAILED DESCRIPTION OF THE INVENTION

Figure 1:
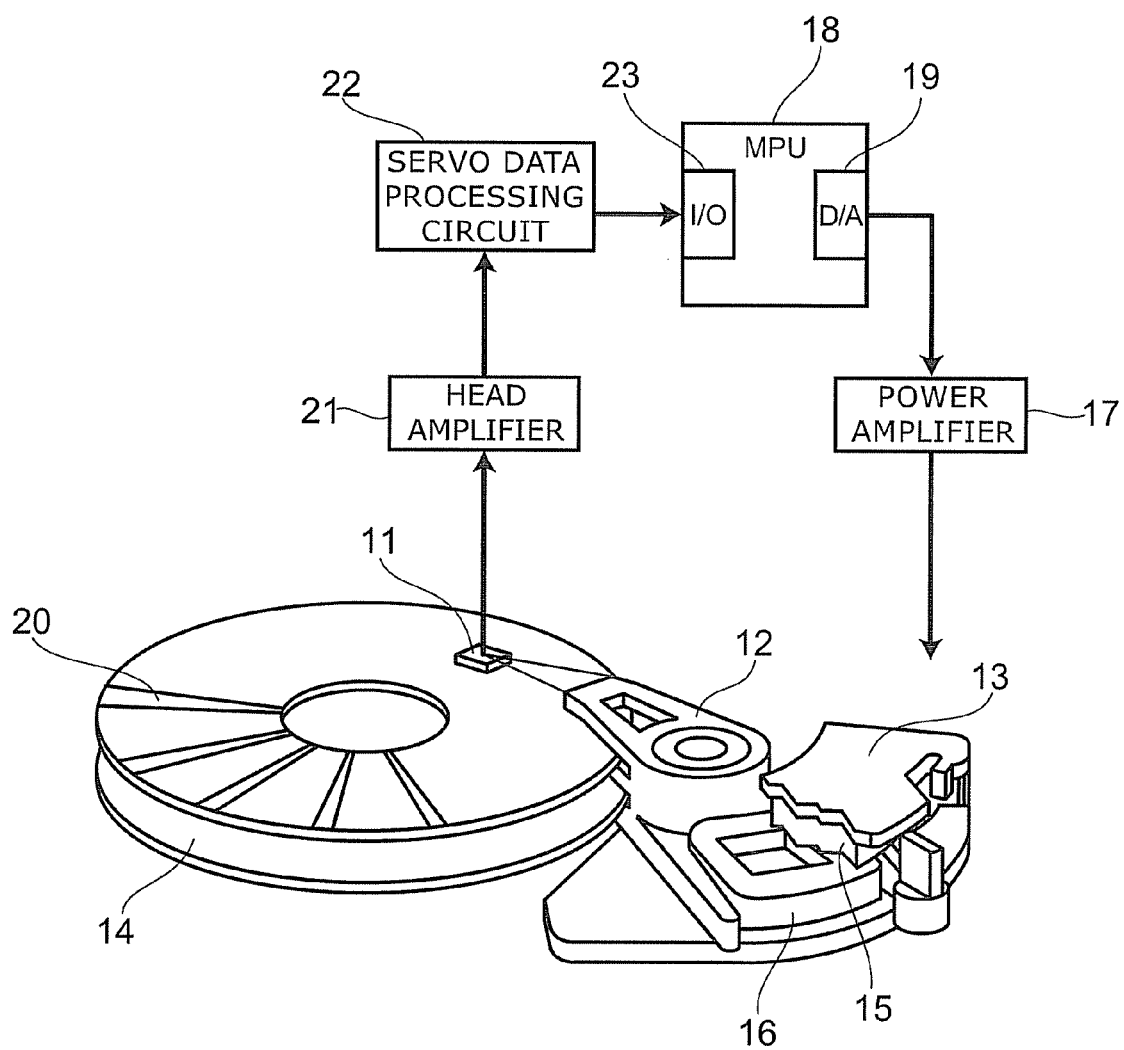
FIG. 1 is a conceptual view showing the relevant part of a magnetic disk apparatus according to an embodiment of the invention.

Embodiments of the invention will now be described with reference to the drawings. Like elements in the drawings are marked with like reference numerals, and the detailed description thereof is omitted as appropriate.

FIG. 1 is a conceptual view showing the relevant part of a magnetic disk apparatus according to an embodiment of the invention.

The magnetic disk apparatus according to this embodiment comprises a head positioning control mechanism (control part) composed primarily of a microprocessor (MPU) 18. A magnetic head 11 is supported by an arm 12. The arm 12 moves the magnetic head 11 in the radial direction of a disk 14 by the driving force of a voice coil motor (VCM) 13. The VCM 13 includes a magnet 15 and a driving coil 16, and is driven by a current supplied from a power amplifier 17. The MPU 18 computes a control command, which is converted to an analog signal by a D/A converter 19 and provided to the power amplifier 17. The power amplifier 17 converts the control command from the MPU 18 to a driving current and supplies it to the VCM 13.

One or more disks 14 are provided, and rapidly rotated by a spindle motor. A plurality of tracks are concentrically formed on the disk 14, and servo areas 20 are provided at regular spacings. The position information of the track is previously embedded in the servo area 20. When the magnetic head 11 traverses the servo area 20, the signal from the magnetic head 11 is read by a head amplifier 21, which amplifies this read signal and supplies the amplified read signal to a servo data processing circuit 22. The servo data processing circuit 22 generates servo information from the amplified read signal and outputs the servo information to the MPU 18 at regular time intervals. The MPU 18 calculates the position of the magnetic head 11 from the servo information received from an I/O 23, and from the obtained magnetic head position, computes a control command to be passed to the VCM 13 at regular time intervals.

Figure 2:
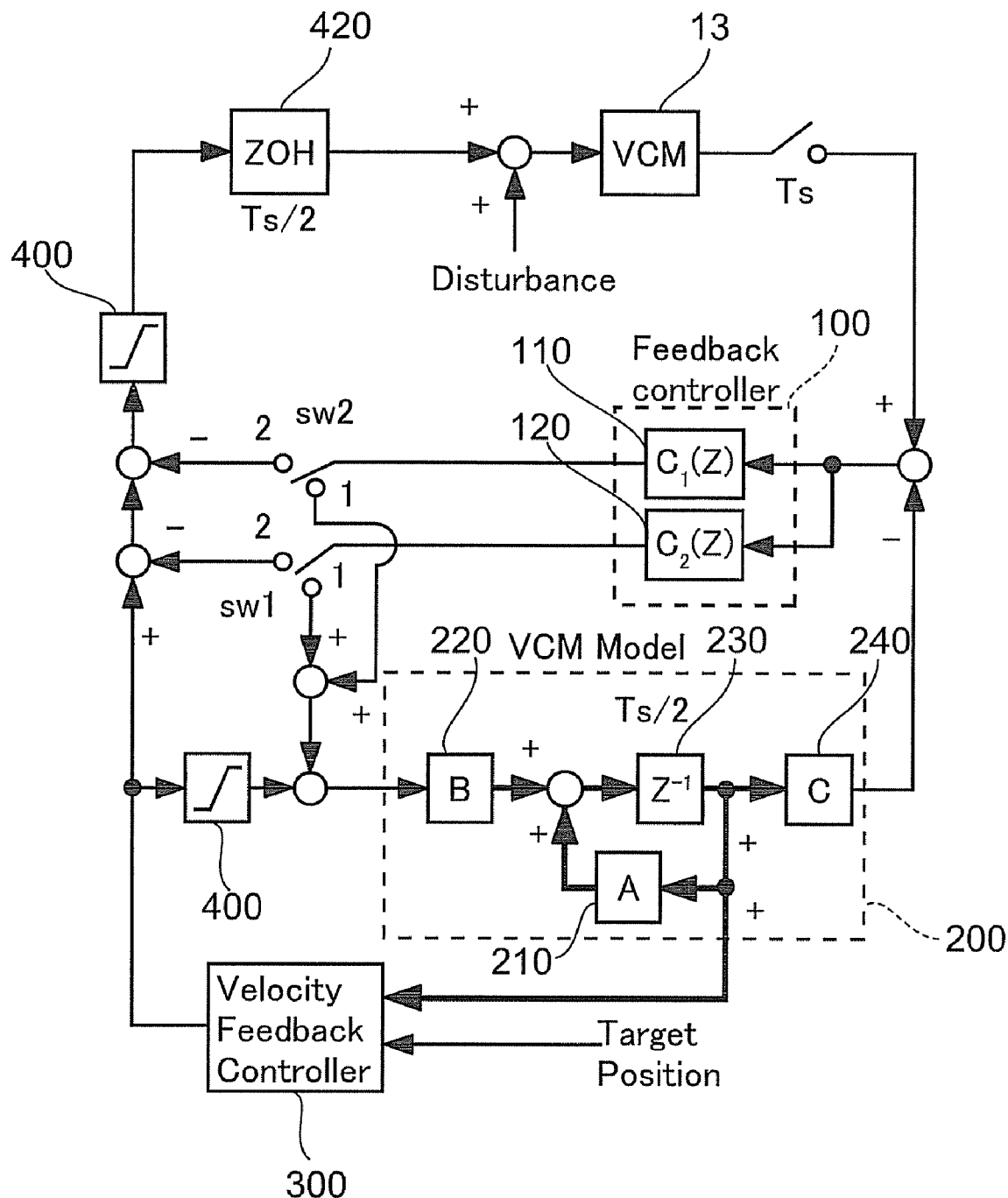
FIG. 2 is a block diagram illustrating a first embodiment of the invention.

FIG. 2 is a block diagram illustrating a first embodiment of the invention.

The seek control system shown in FIG. 2 comprises a position error feedback control system 100 and a model-side control system 200. The model-side control system 200 includes a velocity control system constructed for a hypothetical mathematical model of the actuator, and generates a target position command to be provided to the position error feedback control system 100 and a feedforward control input by causing the model velocity to follow the target velocity. The feedforward control input outputted from the model-side control system 200, in combination with information on the position of the target track (target position), is inputted to a velocity feedback controller 300, which outputs a feedforward control input to the voice coil motor 13 through a limiter 400 and a zero-order holder 420.

In the model-side control system 200, an A matrix 210, a B matrix 220, and a C matrix 240, constituting a state equation, and a one-sample delay 230 are combined.

To improve the seek performance of the actuator (VCM 13), it is important to provide a smooth feedforward control input to the actuator. Hence the model-side control system 200 performs computation with sampling period Ts/2, for example, which is half the period Ts of the position error feedback control system 100.

With regard to the configuration of the velocity control system, in view of current saturation during acceleration, a constant gain feedback is applied to the velocity error. Realization of high-performance seek for the actuator (VCM 13) requires a precise model. However, a high-precision model is difficult to prepare in advance because of dispersion. Hence the model-side control system 200 is updated during the seek to approximate the state of the model to the state of the actuator (VCM 13).

The position error feedback control system 100 includes an integrator 110 and a phase-lead compensator 120. When the control command is not saturated, the switch sw2 (second switch) is connected to the terminal 2 to apply the output of the integrator 110 to the actuator (VCM 13) (first update mode). When the control command is saturated, the switch sw2 is connected to the terminal 1 to apply the output of the integrator 110 to the input of the model-side control system 200 (second update mode). On the other hand, during the first half of the seek in which the remaining distance is long, the switch sw1 (first switch) is connected to the terminal 1 to apply the output of the phase-lead compensator 120 to the input of the model-side control system 200, thereby updating the model-side control system 200 (first update mode). During the second half of the seek in which the remaining distance is short, the switch sw1 is switched to the terminal 2 for operation as an ordinary two-degree-of-freedom control system.

Figure 3:
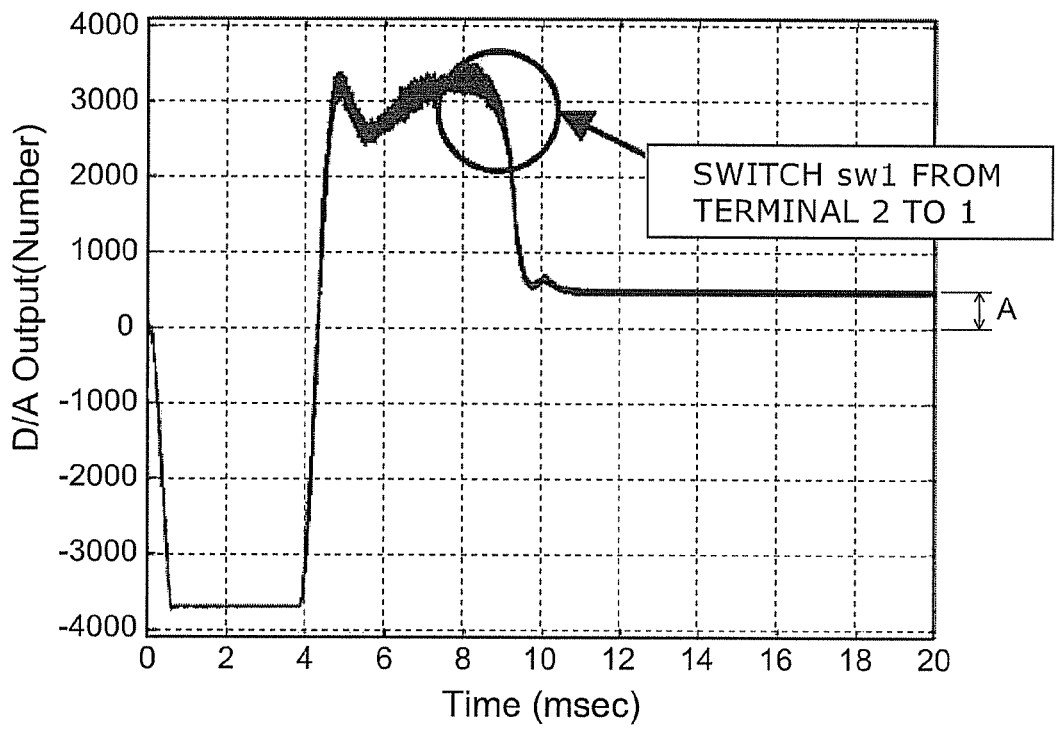
FIG. 3 is a graph showing a control command for a seek to the direction of large external force in this embodiment.

FIG. 3 is a graph (experimental result) showing a control command for a seek to the direction of large external force in this embodiment.

Figure 4:
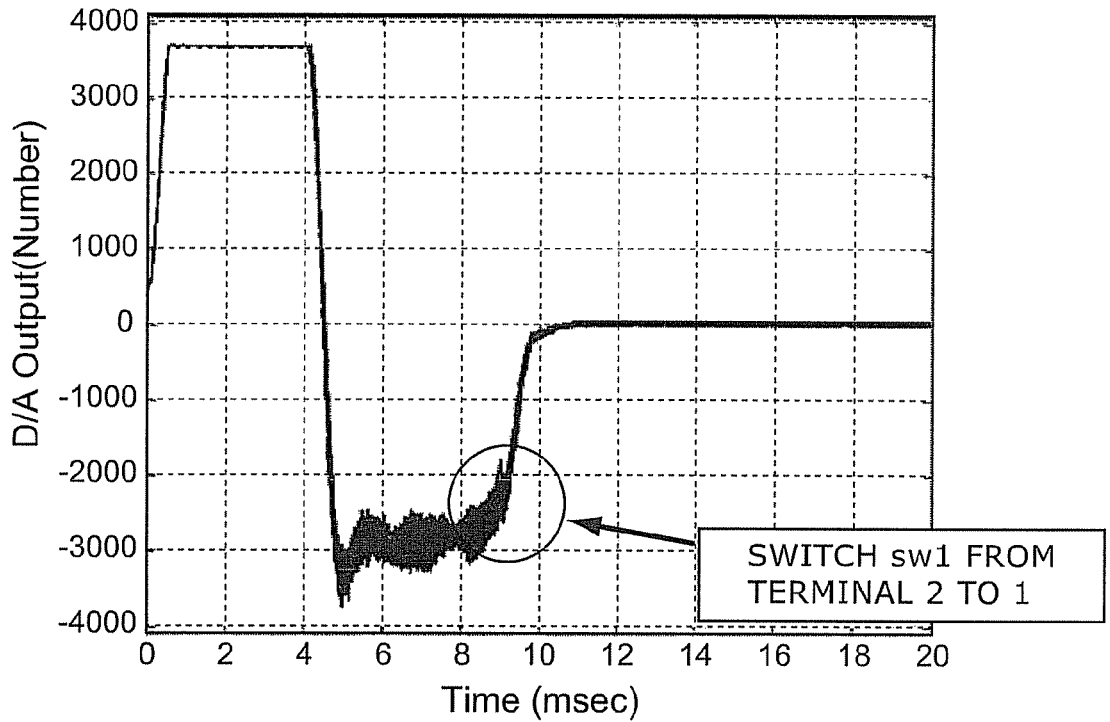
FIG. 4 is a graph showing a control command for a seek to the direction of small external force in this embodiment.

FIG. 4 is a graph (experimental result) showing a control command for a seek to the direction of small external force in this embodiment.

In the graphs shown in FIGS. 3 and 4, the horizontal axis represents time (in milliseconds), and the vertical axis represents the control command value provided to the D/A converter 19 (see FIG. 1).

In the graph shown in FIG. 3, as seen from the magnitude A of the control command value at the end of the seek, an external force of approximately 10% of the maximum control command value is exerted in the magnetic disk apparatus used in this experiment.

It is also found that, in the seek to the direction of large external force such as magnetic latching force, no transient response is produced when the switch sw1 of the seek control system is switched. Furthermore, as seen from the graph shown in FIG. 4, no discontinuous control command is generated at the switching time of the switch sw1 also in the seek to the direction of small external force.

Thus the output of the integrator 110 is applied to the actuator (VCM 13), and the output of the phase-lead compensator 120 is applied to the input of the model-side control system 200. Hence, in both of the seek to the direction of large external force such as magnetic latching force and the seek to the direction of small external force, no transient response is produced at the switching time of the switch sw1 of the seek control system shown in FIG. 2.

Figure 5:
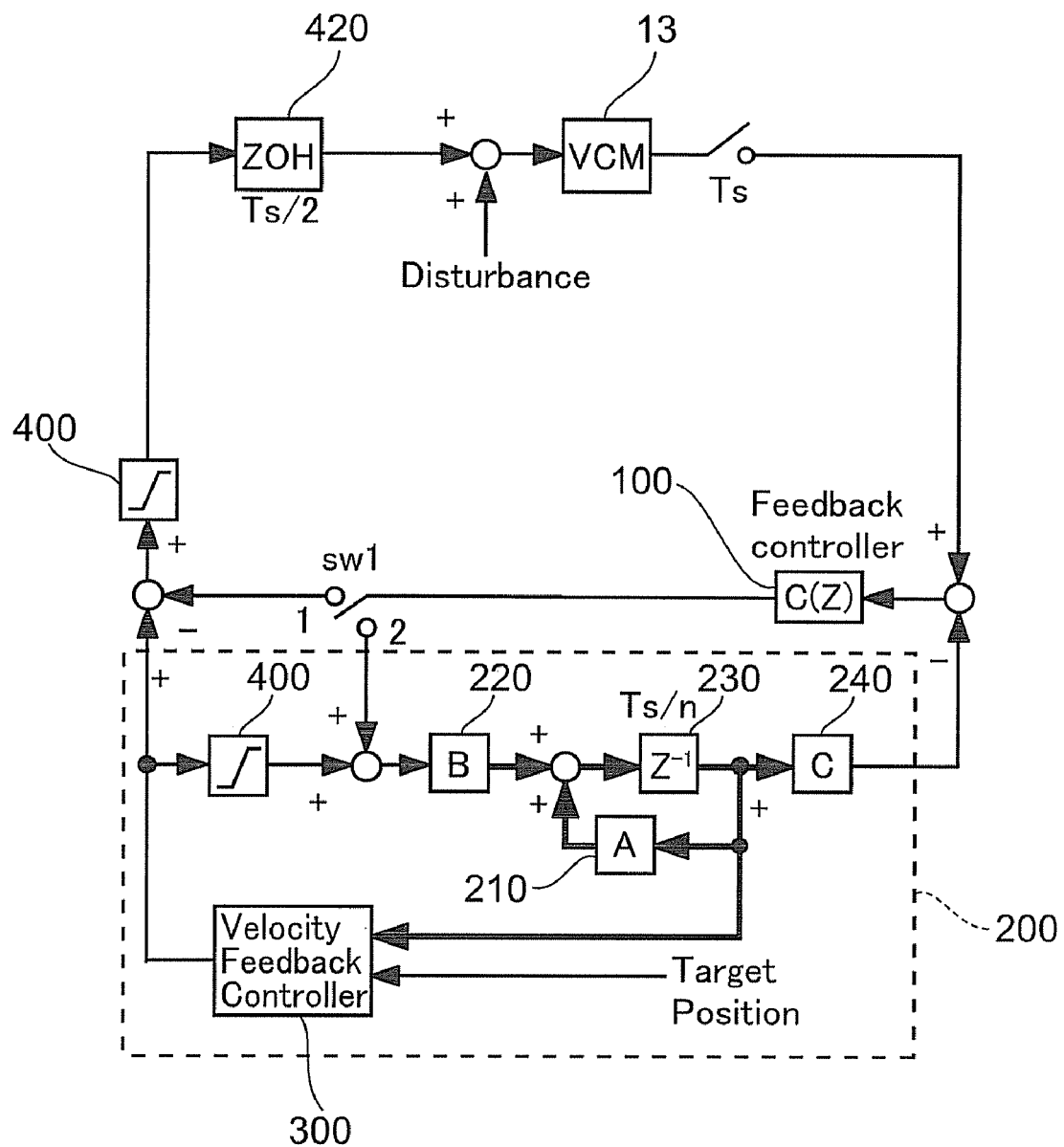
FIG. 5 is a block diagram illustrating a comparative example.

FIG. 5 is a block diagram illustrating a comparative example.

The seek control system shown in FIG. 5 is different from the seek control system of this embodiment shown in FIG. 2 in that the position error feedback control system 100 is not decomposed into an integrator 110 and a phase-lead compensator 120. In such a control system, for smooth transition from seek control to positioning control, a positioning controller is used to update the model-side control system 200 during the first half of the seek, and is switched to an ordinary two-degree-of-freedom control system when the target position comes near.

More specifically, in updating the model-side control system 200 during the first half of the seek, the output of the position error feedback control system 100 is applied to the input of the model-side control system 200 (the switch sw1 is connected to the terminal 2) to approximate the state (position and velocity) of the model to the motion of the actuator. Then, during the second half of the seek, the output of the position error feedback control system 100 is applied to the actuator (the switch sw1 is connected to 1) for operation as an ordinary two-degree-of-freedom control system. Thus the effect of current saturation during the seek and the effect of position sensing noise are reduced.

However, in such a seek control system, in the case where the actuator (VCM 13) is subjected to large external force such as magnetic latching force, the control command may produce a transient response when the switch sw1 is switched. Furthermore, if the arm 12 is moved rapidly, the magnetic head 11 obliquely traverses the servo area 20, and hence erroneously reads a cylinder code, increasing the position sensing noise. The noise affects the velocity feedback controller 300 through the position error feedback control system 100, and an oscillatory component due to the noise occurs in the control command.

To improve the seek performance of the actuator (VCM 13), it is important to provide a smooth feedforward control input to the actuator. Hence the model-side control system 200 performs computation with sampling period Ts/n, which is one n-th of the period Ts of the position error feedback control system 100.

With regard to the configuration of the velocity control system, in view of current saturation during acceleration, a constant gain feedback is applied to the velocity error. Realization of high-performance seek for the actuator (VCM 13) requires a precise model. However, a high-precision model is difficult to prepare in advance because of dispersion. Hence the model-side control system 200 is updated during the seek to approximate the state of the model to the state of the actuator (VCM 13).

Figure 6:
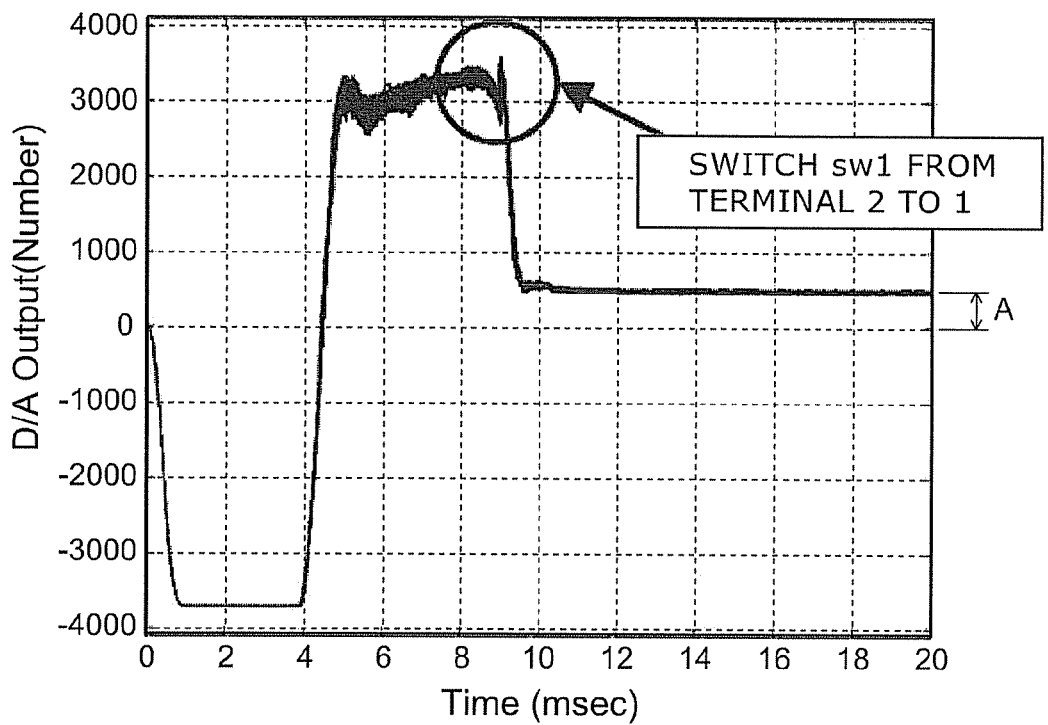
FIG. 6 is a graph showing a control command for a seek to the direction of large external force in the comparative example.

FIG. 6 is a graph (experimental result) showing a control command for a seek to the direction of large external force in the comparative example.

Figure 7:
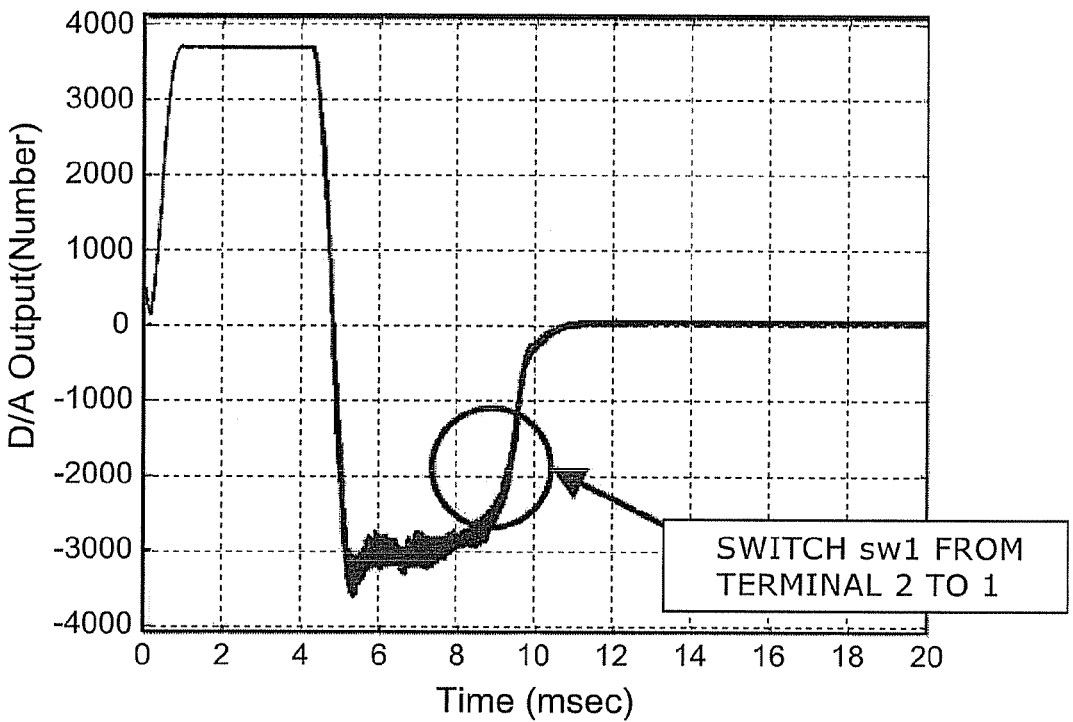
FIG. 7 is a graph showing a control command for a seek to the direction of small external force in the comparative example.

FIG. 7 is a graph (experimental result) showing a control command for a seek to the direction of small external force in the comparative example.

In the graphs shown in FIGS. 6 and 7, the horizontal axis represents time (in milliseconds), and the vertical axis represents the control command value provided to the D/A converter 19 (see FIG. 1).

In the graph shown in FIG. 6, as seen from the magnitude A of the control command value at the end of the seek, an external force of approximately 10% of the maximum control command value is exerted in the magnetic disk apparatus used in this experiment. It is also found that, in the seek to the direction of large external force such as magnetic latching force, a discontinuous control command value is generated at the switching time of the switch sw1.

On the other hand, from the graph shown in FIG. 7, it is found that no discontinuous control command value is provided to the actuator (VCM 13) in the seek to the direction of small external force. As seen from these results, the method of applying the output of the position error feedback control system 100 to the input of the model-side control system 200 such as the comparative example shown in FIG. 5 has no problem for small external force because the transient response due to the switching of the switch sw1 is very small, but has low robustness to external force when large external force such as magnetic latching force acts on the arm 12. A steep transient response of the control command excites mechanical resonance and causes dispersion at the settling time. This increases the number of write inhibits, degrading the performance.

Figure 8:
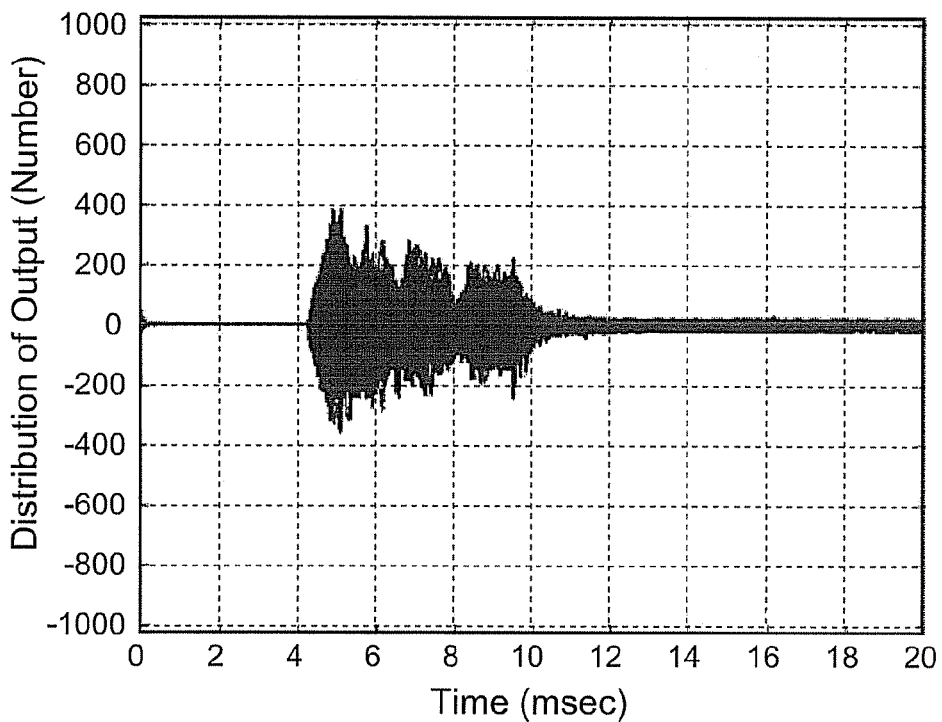
FIG. 8 is a graph showing the dispersion of the control command value shown in FIG. 7 from the average thereof.

FIG. 8 is a graph showing the dispersion of the control command value shown in FIG. 7 from the average thereof.

The horizontal axis represents time (in milliseconds), and the vertical axis represents the control command value provided to the D/A converter 19 (see FIG. 1).

The dispersion at the seek time is much larger than the dispersion in the on-track state after the seek. Furthermore, the dispersion of the control command value decreases as the target position comes nearer and the head speed becomes slower. This is presumably because the position sensing noise affects the velocity control system based on the model velocity through the update of the model-side control system 200. Current dispersion at the seek time increases the sound noise at the seek time and tends to cause dispersion at the settling time.

In the following, an observer is constructed, and the stability of the seek control system according to this embodiment on the sample points is described.

Figure 9:
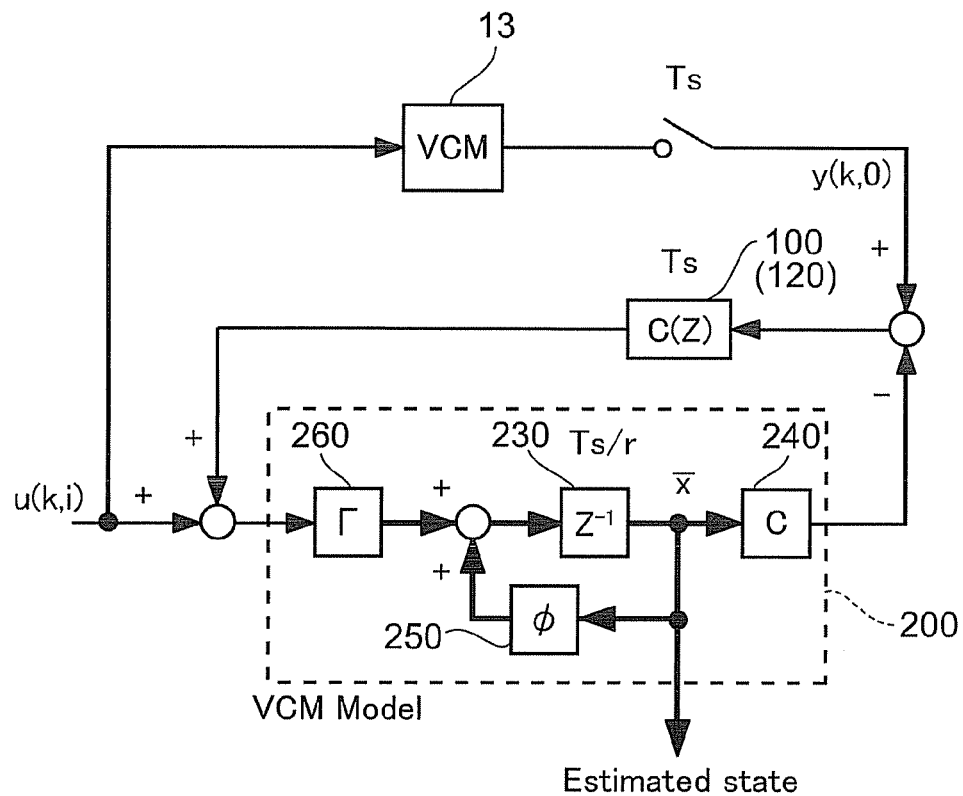
FIG. 9 is a block diagram showing a multirate observer at the model input node.

FIG. 9 is a block diagram showing a multirate observer at the model input node.

Figure 10:
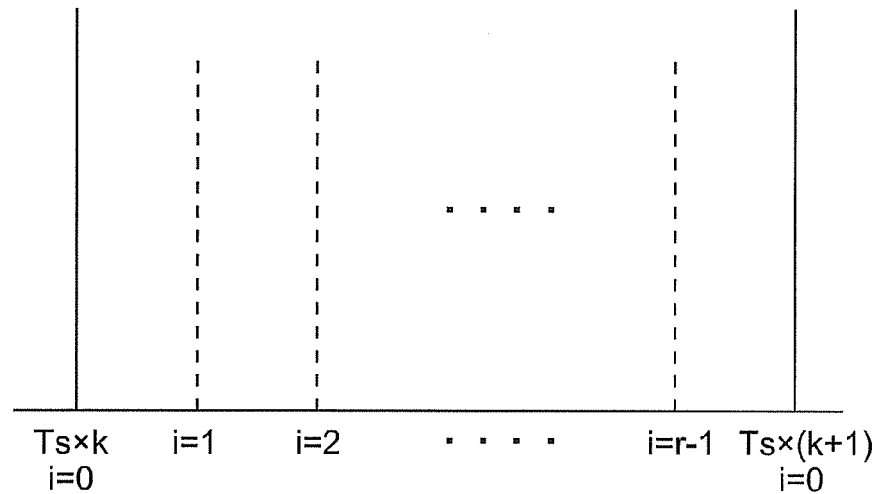
FIG. 10 is a schematic view showing the model update timing.

FIG. 10 is a schematic view showing the model update timing.

In the observer shown in FIG. 9, the output of the phase-lead compensator 120 is applied to the input of the model-side control system 200 to approximate the state of the model to the state of the plant.

To improve the seek performance of the actuator (VCM 13), it is important to provide a smooth feedforward control input to the actuator. Hence, as in the model update timing shown in FIG. 10, the model-side control system 200 performs computation with sampling period Ts/r, which is one r-th of the period Ts of the position error feedback control system 100.

The model of the VCM 13, the VCM 13, and the phase-lead compensator 120 are expressed by equations (1), (2), and (3), respectively:

$$\begin{cases} x(k, i+1) = \Phi x(k, i) + \Gamma u(k, i) \\ y(k, i) = Cx(k, i) \end{cases} \quad (1)$$

$$\begin{cases} \bar{x}(k, i+1) = \Phi \bar{x}(k, i) + \Gamma u(k, i) \\ \bar{y}(k, i) = C\bar{x}(k, i) \end{cases} \quad (2)$$

$$\begin{cases} z(k+1, 0) = Az(k, 0) + B(y(k, 0) - C\bar{x}(k, 0)) \\ H(k, 0) = Kz(k, 0) + D(y(k, 0) - C\bar{x}(k, 0)) \end{cases} \quad (3)$$

The observer constructed as shown in FIG. 9 is expressed by equation (4):

$$\bar{x}(k, i+1) = \Phi \bar{x}(k, i) + \Gamma(u(k, i) + H(k, 0)) \quad (4)$$

The observation error is expressed by equation (5):

$$\bar{e}(k, i) = x(k, i) - \bar{x}(k, i) \quad (5)$$

The state of the model and the VCM 13 on the sample points are expressed by equations (6) and (7), respectively, and equation (5) is rewritten as equation (8):

$$x(k+1, 0) = \Phi^r x(k, 0) + \Phi^{r-1} \Gamma u(k, 0) + \quad (6)$$
$$\Phi^{r-2} \Gamma u(k, 1) + \Lambda + \Phi \Gamma u(k, r-2) + \Gamma u(k, r-1)$$

$$\bar{x}(k+1, 0) = \quad (7)$$
$$\Phi^r \bar{x}(k, 0) + \Phi^{r-1} \Gamma u(k, 0) + \Phi^{r-2} \Gamma u(k, 1) + \Lambda + \Phi \Gamma u(k, r-2) +$$
$$\Gamma u(k, r-1) + (\Phi^{r-1} \Gamma + \Phi^{r-2} \Gamma + \Lambda + \Gamma)(Kz(k, 0) + DC\bar{e}(k, 0))$$

-continued $$\bar{e}(k+1, 0) = x(k+1, 0) - \bar{x}(k+1, 0) \quad (8)$$
$$= \left(\Phi^r - \sum_{j=0}^{r-1} \Phi^j \Gamma DC\right) \bar{e}(k, 0) - \sum_{j=0}^{r-1} \Phi^j \Gamma Kz(k, 0)$$

These equations yield an error system on the sample points given by equation (9):

$$\begin{bmatrix} \bar{e}(k+1, 0) \\ z(k+1, 0) \end{bmatrix} = \begin{bmatrix} \Phi^r - \sum_{j=0}^{r-1} \Phi^j \Gamma DC & -\sum_{j=0}^{r-1} \Phi^j \Gamma K \\ BC & A \end{bmatrix} \begin{bmatrix} \bar{e}(k, 0) \\ z(k, 0) \end{bmatrix} \quad (9)$$

It turns out from the above calculation that the observer is stable if the eigenvalues of equation (9) lie within the unit circle.

In the following, it is discussed whether this condition is always satisfied.

Figure 11:
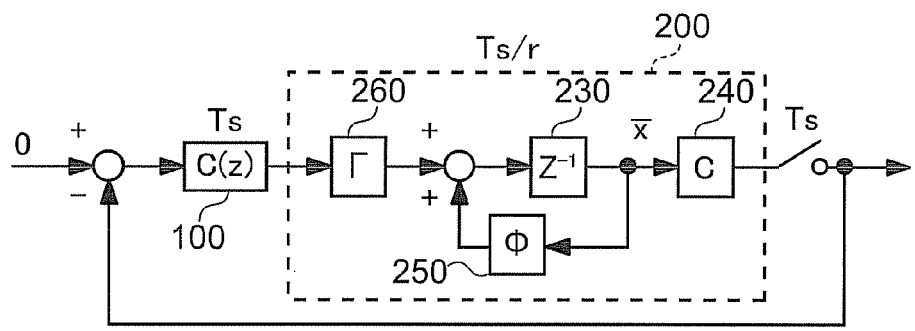
FIG. 11 is a block diagram showing a feedback control system of a simple model-side control system.

FIG. 11 is a block diagram showing a feedback control system of a simple model-side control system.

In the control system shown in FIG. 11, the controlled object is calculated at 1/r of the period Ts at which the position error feedback control system 100 is calculated. This control system is the same as a feedback system with period Ts in view of the response on the sample points. Hence, first, equations (10) and (11) hold:

$$\begin{cases} z(k+1, 0) = Az(k, 0) - BC\bar{x}(k, 0) \\ H(k, 0) = Kz(k, 0) - DC\bar{x}(k, 0) \end{cases} \quad (10)$$

$$\bar{x}(k, i+1) = \Phi \bar{x}(k, i) + \Gamma H(k, 0) \quad (11)$$

The following equation is derived from these equations:

$$\bar{x}(k+1, 0) = \Phi^r \bar{x}(k, 0) + \Phi^{r-1} \Gamma H(k, 0) + \Lambda + \quad (12)$$
$$\Phi^2 \Gamma H(k, 0) + \Gamma H(k, 0) + \Gamma H(k, 0)$$
$$= \Phi^r \bar{x}(k, 0) + (\Phi^{r-1} + \Lambda + \Phi^2 + \Phi + I) \Gamma H(k, 0)$$
$$= \Phi^r \bar{x}(k, 0) +$$
$$(\Phi^{r-1} + \Lambda + \Phi^2 + \Phi + I) \Gamma (Kz(k, 0) - DC\bar{x}(k, 0))$$
$$= \left(\Phi^r - \sum_{j=0}^{r-1} \Phi^j \Gamma DC\right) \bar{x}(k, 0) - \sum_{j=0}^{r-1} \Phi^j \Gamma Kz(k, 0)$$

This yields the following equation:

$$\begin{bmatrix} \bar{x}(k+1, 0) \\ z(k+1, 0) \end{bmatrix} = \begin{bmatrix} \Phi^r - \sum_{j=0}^{r-1} \Phi^j \Gamma DC & \sum_{j=0}^{r-1} \Phi^j \Gamma K \\ -BC & A \end{bmatrix} \begin{bmatrix} \bar{x}(k, 0) \\ z(k, 0) \end{bmatrix} \quad (13)$$

Here, the following equation is known to hold generally:

$$\det\begin{bmatrix} A & B \\ C & D \end{bmatrix} = \det A \cdot \det(D - CA^{-1}B) \quad (14)$$

Thus it turns out that the determinant of equation (13) equals that of equation (9). Hence, if the position error feedback control system 100 is configured so that the feedback loop is stabilized for the controlled object discretized at period Ts, then equation (9) is stable.

As described above, according to this embodiment, the position error feedback control system 100 is decomposed into an integrator 110 and a phase-lead compensator 120. The model-side control system 200 is updated by applying the output of the integrator 110 to the actuator (VCM 13) and applying the output of the phase-lead compensator 120 to the input of the model-side control system 200. However, when the control command is saturated, the output of the integrator 110 is applied to the input of the model-side control system 200. Thus, even in an environment subjected to large external force, the transient response due to the switching of control systems can be reduced, allowing construction of a seek control system robust to external force.

Next, a seek control system according to a second embodiment of the invention is described.

Figure 12:
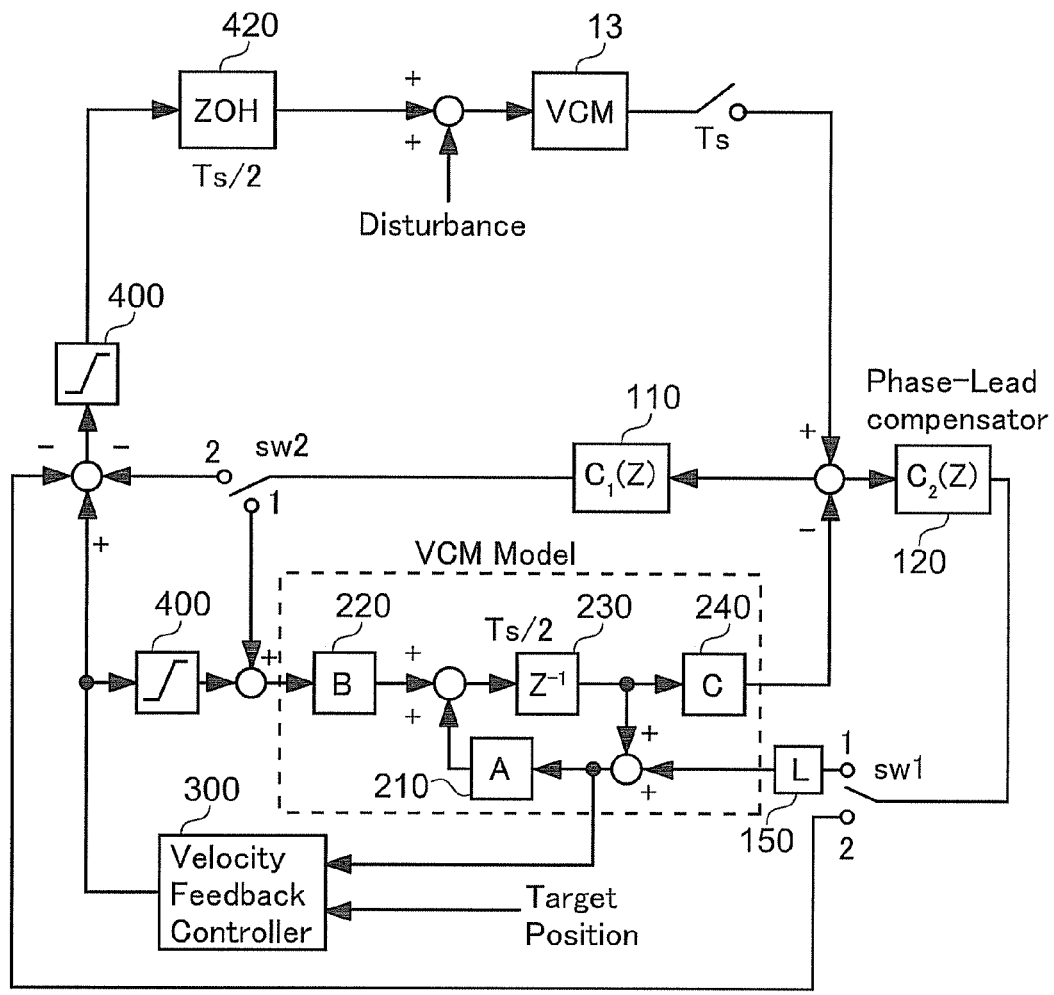
FIG. 12 is a block diagram illustrating the second embodiment of the invention.

FIG. 12 is a block diagram illustrating the second embodiment of the invention.

In the seek control system shown in FIG. 12, like the seek control system shown in FIG. 2, the position error feedback control system 100 is decomposed into an integrator 110 and a phase-lead compensator 120. Furthermore, the seek control system shown in FIG. 12 comprises a model-side control system 200. The model-side control system 200 includes a velocity control system constructed for a hypothetical mathematical model of the actuator, and generates a target position command to be provided to the position error feedback control system 100 and a feedforward control input by causing the model velocity to follow the target velocity. The feedforward control input outputted from the model-side control system 200, in combination with information on the position of the target track, is inputted to a velocity feedback controller 300, which outputs a feedforward control input to the voice coil motor 13 through a limiter 400 and a zero-order holder 420.

In the model-side control system 200, like the seek control system shown in FIG. 2, an A matrix 210, a B matrix 220, and a C matrix 240, constituting a state equation, and a one-sample delay 230 are combined.

To improve the seek performance of the actuator (VCM 13), it is important to provide a smooth feedforward control input to the actuator. Hence the model-side control system 200 performs computation with sampling period Ts/2, for example, which is half the period Ts of the position error feedback control system 100.

With regard to the configuration of the velocity control system, in view of current saturation during acceleration, a constant gain feedback is applied to the velocity error. Realization of high-performance seek for the actuator (VCM 13) requires a precise model. However, a high-precision model is difficult to prepare in advance because of dispersion. Hence the model-side control system 200 is updated during the seek to approximate the state of the model to the state of the actuator (VCM 13).

When the control command is not saturated, the switch sw2 is connected to the terminal 2 to apply the output of the integrator 110 to the actuator (VCM 13). When the control command is saturated, the switch sw2 is connected to the terminal 1 to apply the output of the integrator 110 to the input of the model-side control system 200. On the other hand, during the first half of the seek in which the remaining distance is long, the switch sw1 is connected to the terminal 1 to apply the output of the phase-lead compensator 120 to the input of the model-side control system 200 through a fixed gain L 500, thereby updating the model-side control system 200. During the second half of the seek in which the remaining distance is short, the switch sw1 is switched to the terminal 2 for operation as an ordinary two-degree-of-freedom control system.

Figure 13:
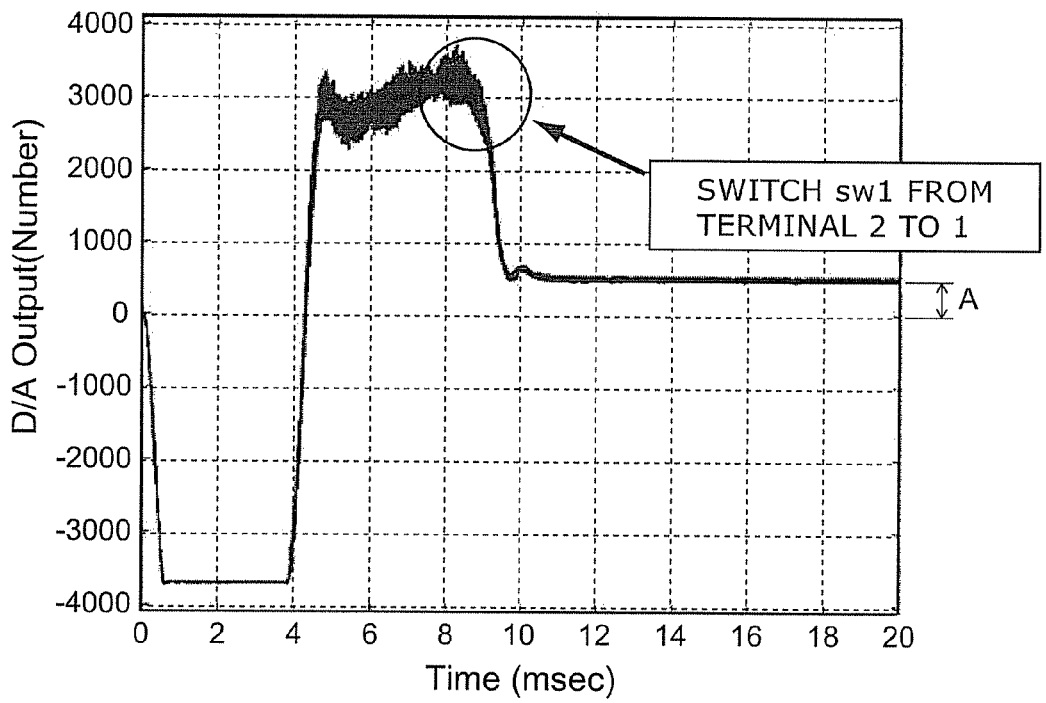
FIG. 13 is a graph (experimental result) showing a control command for a seek to the direction of large external force in this embodiment.

FIG. 13 is a graph (experimental result) showing a control command for a seek to the direction of large external force in this embodiment.

Figure 14:
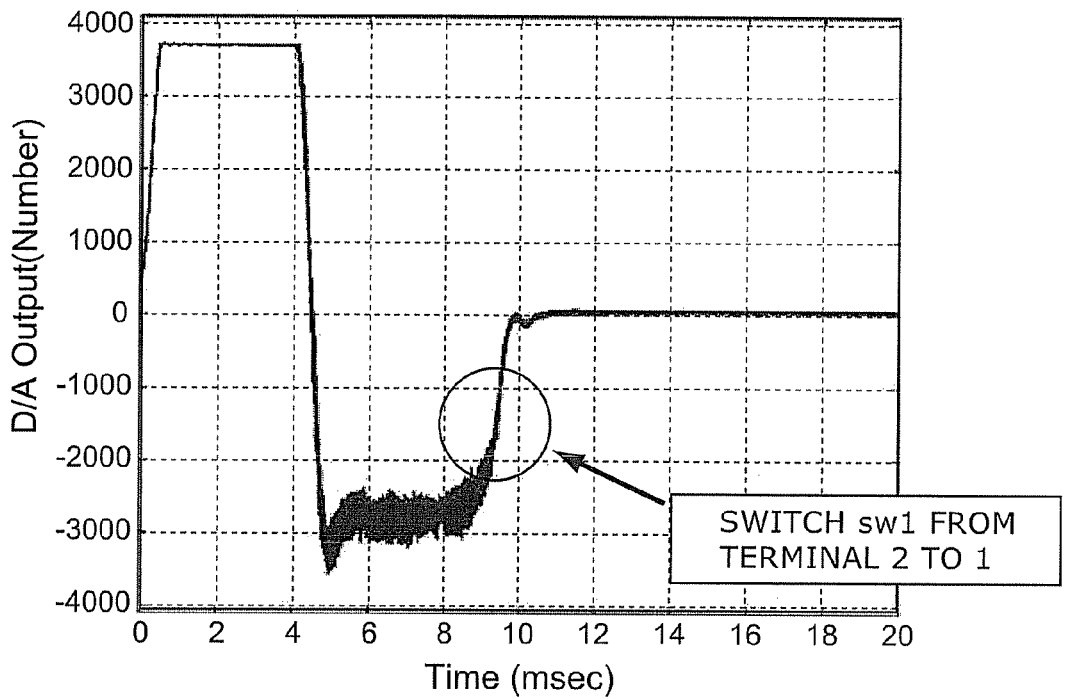
FIG. 14 is a graph showing a control command for a seek to the direction of small external force in this embodiment.

FIG. 14 is a graph (experimental result) showing a control command for a seek to the direction of small external force in this embodiment.

In the graphs shown in FIGS. 13 and 14, the horizontal axis represents time (in milliseconds), and the vertical axis represents the control command value provided to the D/A converter 19 (see FIG. 1). The gain L 500 is set to $L=[1\ 1]^T$.

In the graph shown in FIG. 13, as seen from the magnitude A of the control command value at the end of the seek, an external force of approximately 10% of the maximum control command value is exerted in the magnetic disk apparatus used in this experiment.

It is also found that, in the seek to the direction of large external force such as magnetic latching force, no transient response is produced when the switch sw1 of the seek control system is switched. Furthermore, as seen from the graph shown in FIG. 14, no discontinuous control command is generated at the switching time of the switch sw1 also in the seek to the direction of small external force.

Figure 15:
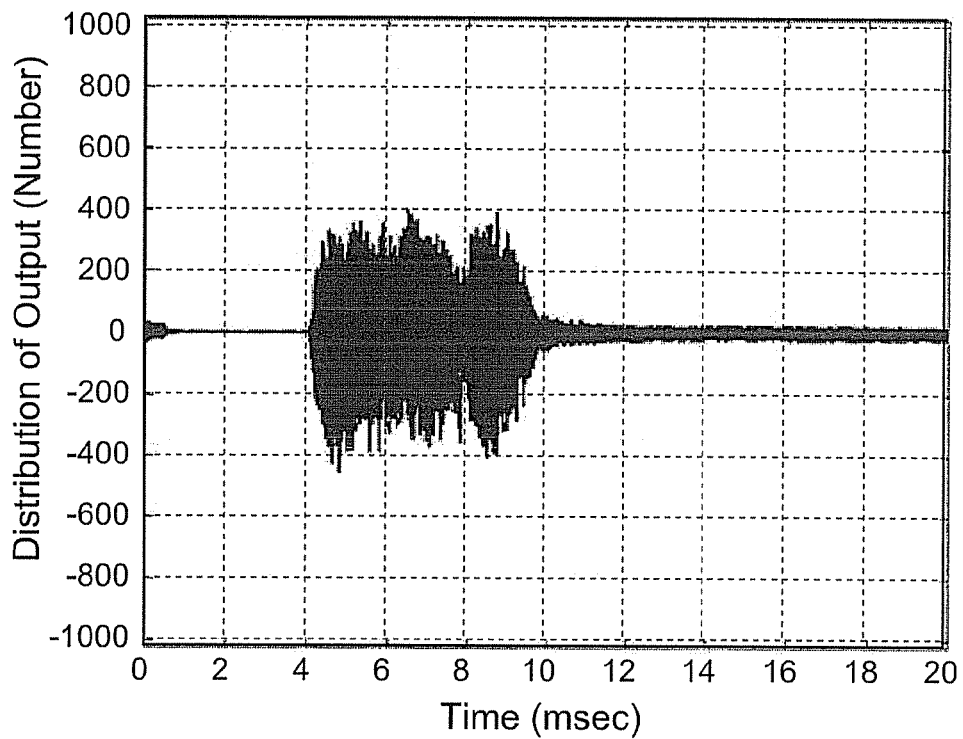
FIG. 15 is a graph showing the dispersion of the control command value shown in FIG. 14 from the average thereof.

FIG. 15 is a graph showing the dispersion of the control command value shown in FIG. 14 from the average thereof.

The horizontal axis represents time (in milliseconds), and the vertical axis represents the control command value provided to the D/A converter 19 (see FIG. 1).

Also in the seek control system according to this embodiment, it is found that the dispersion at the seek time is much larger than the dispersion in the on-track state after the seek. This is presumably because the control command is generated in the velocity control system of the model-side control system 200 and hence affects the model through the output of the phase-lead compensator 120.

In the following, an observer is constructed, and the stability of the seek control system according to this embodiment on the sample points is described.

Figure 16:
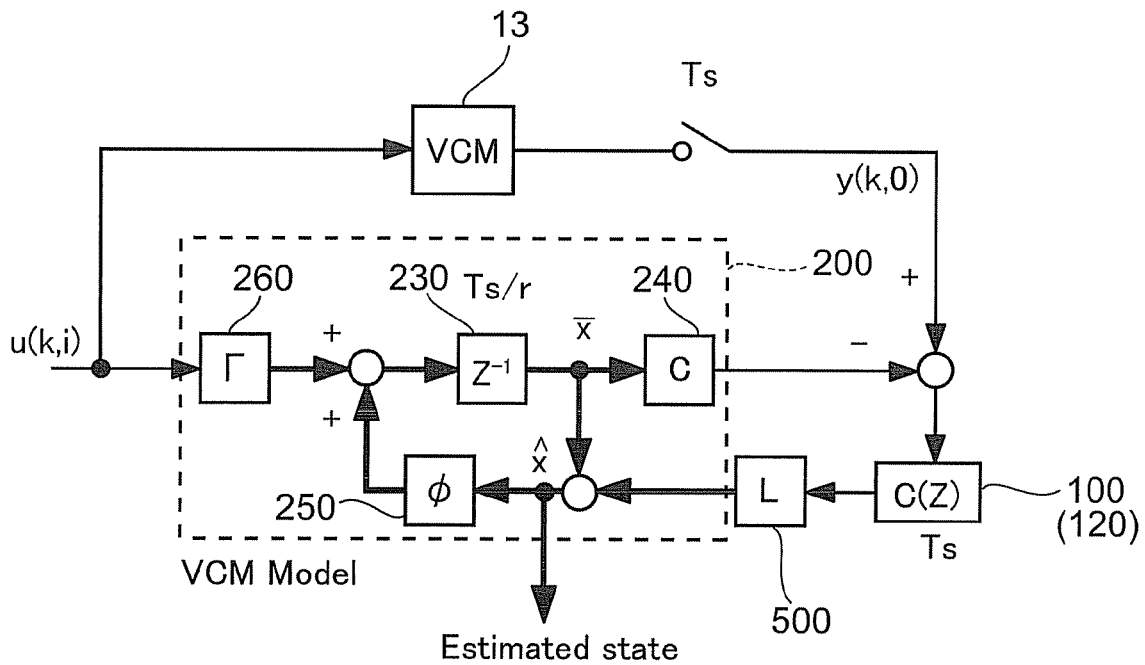
FIG. 16 is a block diagram showing a multirate observer at the model state node.

FIG. 16 is a block diagram showing a multirate observer at the model state node.

In the observer shown in FIG. 16, like the Kalman filter, the output of the phase-lead compensator 120 is added to the state of the model.

To improve the seek performance of the actuator (VCM 13), it is important to provide a smooth feedforward control input to the actuator. Hence, like the model update timing shown in FIG. 10, the model-side control system 200 performs computation with sampling period Ts/r, which is one r-th of the period Ts of the position error feedback control system 100.

The model of the VCM 13 is expressed by equation (1), and the phase-lead compensator 120 is expressed by equation (3). Then the following equation (15) holds:

$$\begin{cases} \overline{x}(k, i) = \Phi\hat{x}(k-1, r-1) + \Gamma u(k-1, r-1) & (i = 0) \\ \overline{x}(k, i) = \Phi\hat{x}(k, i-1) + \Gamma u(k, i-1) & (i = 1, \Lambda, r-1) \\ \hat{x}(k, i+1) = \overline{x}(k, i) + LH(k, 0) \\ \qquad = \overline{x}(k, i) + LKz(k, 0) + LD(y(k, 0) - C\overline{x}(k, 0)) \end{cases} \quad (15)$$

These equations yield, likewise, an error system on the sample points given by equation (16):

$$\begin{bmatrix} \overline{e}(k+1, 0) \\ z(k+1, 0) \end{bmatrix} = \begin{bmatrix} \Phi^r - \sum_{j=0}^{r-1} \Phi^j LDC & \sum_{j=0}^{r-1} \Phi^j LK \\ -BC & A \end{bmatrix} \begin{bmatrix} \overline{e}(k, 0) \\ z(k, 0) \end{bmatrix} \quad (16)$$

In view of the above calculation, it is suitable to determine the gain L 500 so that the eigenvalues of equation (16) lie within the unit circle.

As described above, according to this embodiment, the position error feedback control system 100 is decomposed into an integrator 110 and a phase-lead compensator 120. The model-side control system 200 is updated by applying the output of the integrator 110 to the actuator (VCM 13) and applying the output of the phase-lead compensator 120 to the input of the model-side control system 200. However, when the control command is saturated, the output of the integrator 110 is applied to the input of the model-side control system 200. Thus, even in an environment subjected to large external force, the transient response due to the switching of control systems can be reduced, allowing construction of a seek control system robust to external force.

Next, a seek control system according to a third embodiment of the invention is described.

Figure 17A:
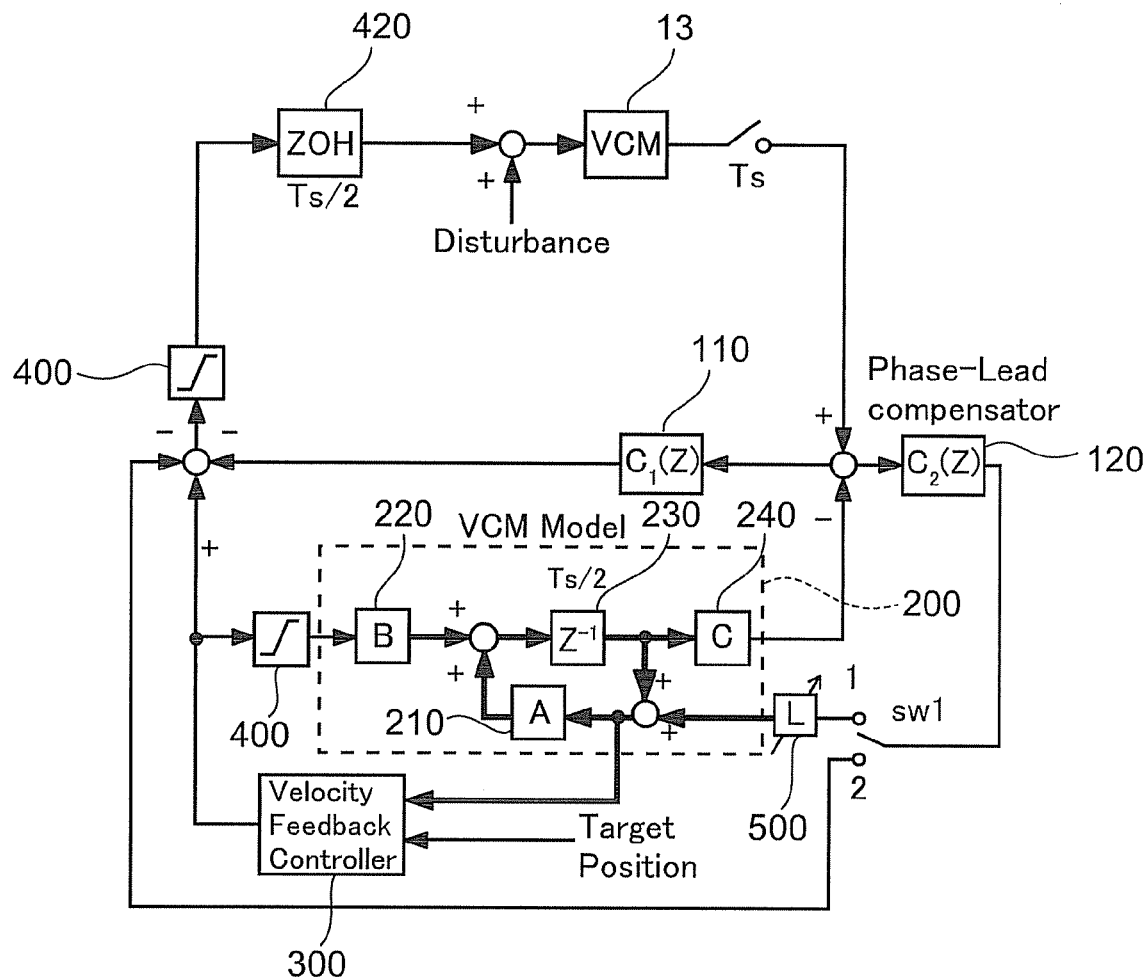
FIG. 17A is a block diagram illustrating the third embodiment of the invention.
Figure 17B:
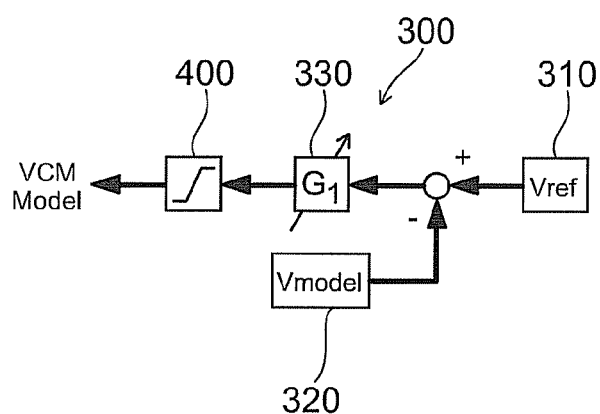
FIG. 17B is a schematic diagram illustrating a velocity feedback controller 300.

FIG. 17A is a block diagram illustrating the third embodiment of the invention, and FIG. 17B is a schematic diagram illustrating a velocity feedback controller 300.

In the seek control system shown in FIG. 17A, like the seek control system shown in FIG. 2, the position error feedback control system 100 is decomposed into an integrator 110 and a phase-lead compensator 120. Furthermore, the seek control system shown in FIG. 17A comprises a model-side control system 200. The model-side control system 200 includes a velocity control system constructed for a hypothetical mathematical model of the actuator, and generates a target position command to be provided to the position error feedback control system 100 and a feedforward control input by causing the model velocity to follow the target velocity. The feedforward control input outputted from the model-side control system 200, in combination with information on the position of the target track, is inputted to a velocity feedback controller 300, which outputs a feedforward control input to the voice coil motor 13 through a limiter 400 and a zero-order holder 420.

In the model-side control system 200, like the seek control system shown in FIG. 2, an A matrix 210, a B matrix 220, and a C matrix 240, constituting a state equation, and a one-sample delay 230 are combined.

To improve the seek performance of the actuator (VCM 13), it is important to provide a smooth feedforward control input to the actuator. Hence the model-side control system 200 performs computation with sampling period Ts/2, for example, which is half the period Ts of the position error feedback control system 100.

With regard to the configuration of the velocity control system, in view of current saturation during acceleration, a constant gain feedback is applied to the velocity error. Realization of high-performance seek for the actuator (VCM 13) requires a precise model. However, a high-precision model is difficult to prepare in advance because of dispersion. Hence the model-side control system 200 is updated during the seek to approximate the state of the model to the state of the actuator (VCM 13).

The velocity feedback controller 300 includes a target velocity curve determination unit 310 and a model velocity curve determination unit 320, which store a target velocity curve $V_{ref}$ and a model velocity curve $V_{model}$, respectively. The velocity feedback gain determination unit 330 stores a velocity feedback gain $G_1$, which varies in accordance with the target velocity curve $V_{ref}$ or the model velocity curve $V_{model}$.

The output of the integrator 110 is applied to the actuator (VCM 13). Like the seek control system shown in FIG. 2 or 11, when the control command is not saturated, the switch sw2 (see FIG. 2 or 11) may be connected to the terminal 2 to apply the output of the integrator 110 to the actuator (VCM 13), and when the control command is saturated, the switch sw2 may be connected to the terminal 1 to apply the output of the integrator 110 to the input of the model-side control system 200.

On the other hand, during the first half of the seek in which the remaining distance is long, the switch sw1 is connected to the terminal 1 to apply the output of the phase-lead compensator 120 to the input of the model-side control system 200 through a gain L 500 varying in accordance with the remaining distance to the target position, thereby updating the model-side control system 200. During the second half of the seek in which the remaining distance is short, the switch sw1 is switched to the terminal 2 for operation as an ordinary two-degree-of-freedom control system.

The update of the model-side control system 200 may be performed by passing the output of the phase-lead compensator 120 through the velocity feedback gain $G_1$ that varies in accordance with the target velocity curve $V_{ref}$. Alternatively, the update of the model-side control system 200 may be performed by passing the output of the phase-lead compensator 120 through the velocity feedback gain $G_1$ that varies in accordance with the model velocity curve $V_{model}$.

Figures 18, 19:
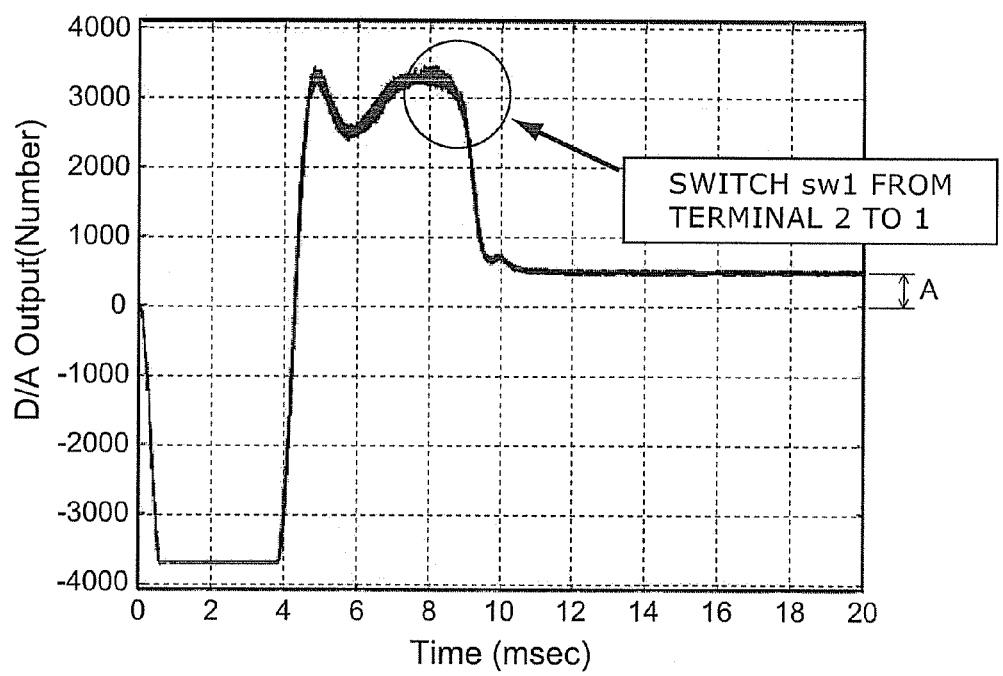
FIG. 18 conceptually illustrates a table of the switching condition for the gain L.
FIG. 19 is a graph (experimental result) showing a control command for a seek to the direction of large external force in this embodiment.

FIG. 18 conceptually illustrates a table of the switching condition for the gain L.

More specifically, the gain L 500 and the terminal position of the switch sw1 can be each specified for various remaining distances to the target position.

When the remaining distance is long, the magnetic head has high speed, and the position sensing noise is large. Hence the effect of noise on the model is reduced by decreasing the gain L 500. While the estimation error of the model is increased by decreasing the gain L 500, the effect of the increased estimation error on the settling is considered to be small because the target position is distant. Then, as the remaining distance decreases, the gain L 500 is increased to reduce the estimation error. When the remaining distance further decreases, the switch sw1 is connected to the terminal 2.

FIG. 19 is a graph (experimental result) showing a control command for a seek to the direction of large external force in this embodiment.

Figure 20:
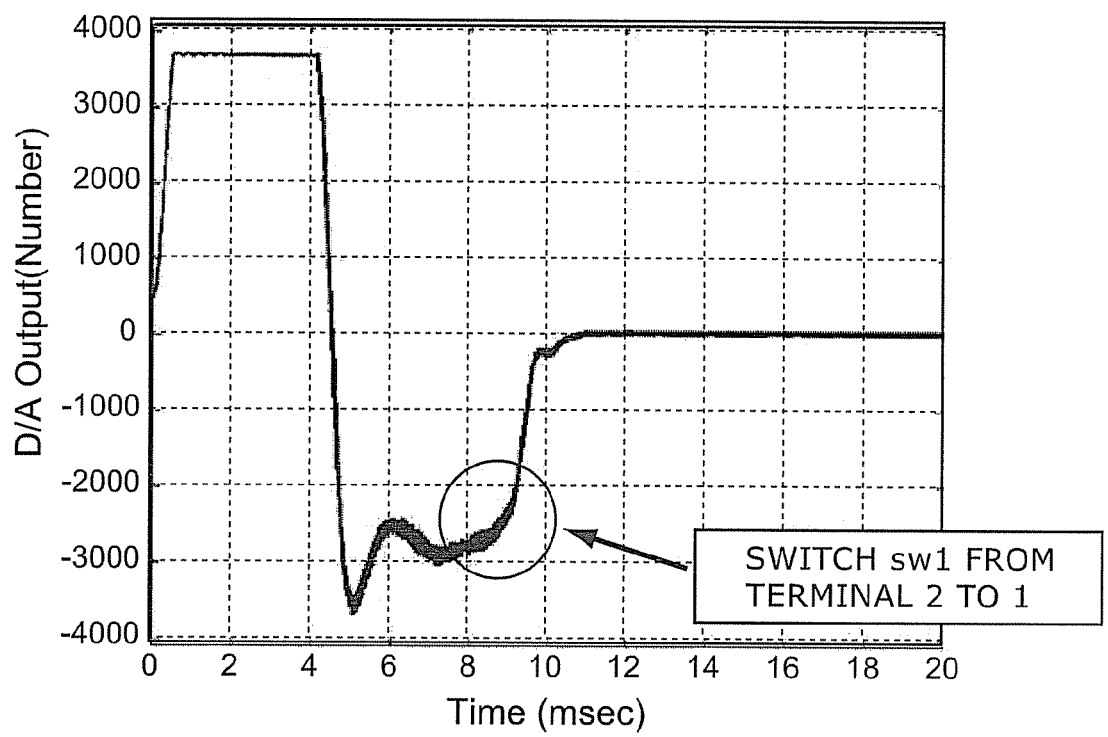
FIG. 20 is a graph showing a control command for a seek to the direction of small external force in this embodiment.

FIG. 20 is a graph (experimental result) showing a control command for a seek to the direction of small external force in this embodiment.

In the graphs shown in FIGS. 19 and 20, the horizontal axis represents time (in milliseconds), and the vertical axis represents the control command value provided to the D/A converter 19 (see FIG. 1).

In the graph shown in FIG. 19, as seen from the magnitude A of the control command value at the end of the seek, an external force of approximately 10% of the maximum control command value is exerted in the magnetic disk apparatus used in this experiment.

It is also found that, in the seek to the direction of large external force such as magnetic latching force, no transient response is produced when the switch sw1 of the seek control system is switched, because the output of the integrator 110 is applied to the actuator (VCM 13). Furthermore, as seen from the graph shown in FIG. 20, no discontinuous control command is generated at the switching time of the switch sw1 also in the seek to the direction of small external force.

Figure 21:
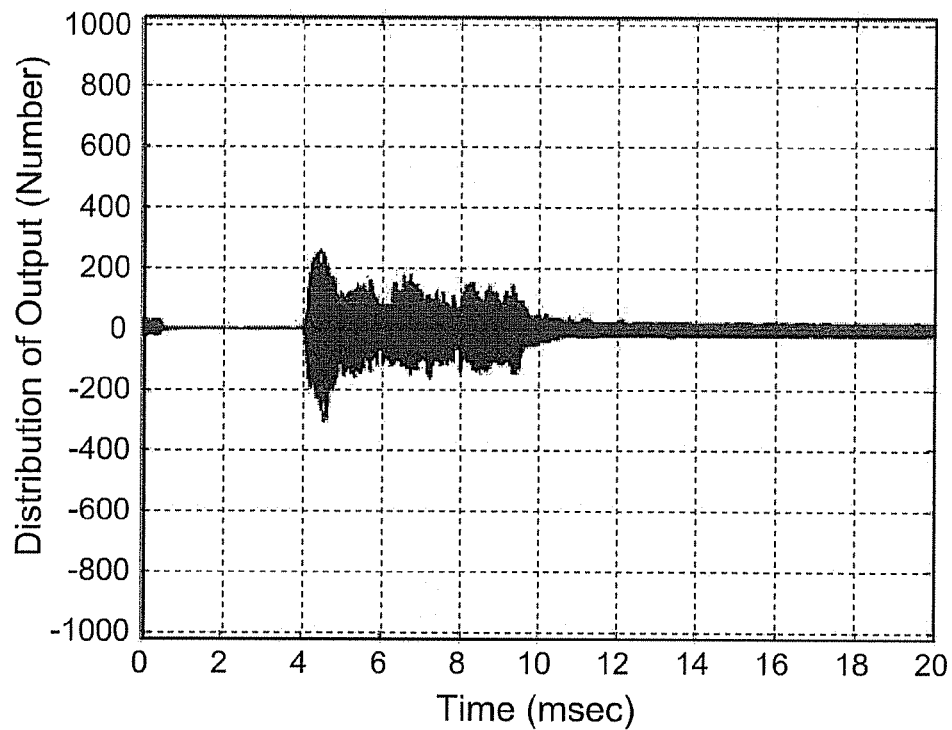
FIG. 21 is a graph showing the dispersion of the control command value shown in FIG. 20 from the average thereof.

FIG. 21 is a graph showing the dispersion of the control command value shown in FIG. 20 from the average thereof.

The horizontal axis represents time (in milliseconds), and the vertical axis represents the control command value provided to the D/A converter 19 (see FIG. 1).

As seen from the graph shown in FIG. 21, dispersion is reduced as compared with the graphs shown in FIGS. 8 and 15, because the model-side control system 200 is updated by passing the output of the phase-lead compensator 120 through the variable gain L 500 or the variable gain $G_1$.

As described above, according to this embodiment, the position error feedback control system 100 is decomposed into an integrator 110 and a phase-lead compensator 120. The model-side control system 200 is updated by applying the output of the integrator 110 to the actuator (VCM 13) and applying the output of the phase-lead compensator 120 to the input of the model-side control system 200. Thus, even in an environment subjected to large external force, the transient response due to the switching of control systems can be reduced, allowing construction of a seek control system robust to external force. Furthermore, the update of the model-side control system 200 is performed by applying the output of the phase-lead compensator 120 to the input of the model-side control system 200 through the gain which varies in accordance with the remaining distance to the target position, the target velocity curve $V_{ref}$ or the model velocity curve $V_{model}$. Hence the effect of position sensing noise during rapid motion of the magnetic head can be reduced.

The embodiments of the invention have been described. However, the invention is not limited to the above description. The above embodiments can be appropriately modified by those skilled in the art, and such modifications are also encompassed within the scope of the invention as long as they include the features of the invention. For example, the elements provided in the seek control system and the arrangement thereof are not limited to those illustrated above, but can be appropriately modified.

The elements provided in the above embodiments can be combined with each other as long as technically feasible, and such combinations are also encompassed within the scope of the invention as long as they include the features of the invention.

The invention claimed is:

1. A magnetic disk apparatus comprising:
   a driving unit configured to move a magnetic head operative to record and reproduce information on a magnetic disk; and
   control part configured to control the driving unit,
   the control part including:
      a position error feedback control system having an integrator and a phase-lead compensator and being operative to determine a position command based on a target position and a sensed position of the magnetic head, thereby performing feedback control on the driving unit; and
      a two-degree-of-freedom control system configured to receive as input a target moving distance of the magnetic head and to output a current command to the driving unit by using a mathematical model of the driving unit, and
   the control part updating the mathematical model, and having a first update mode in which the mathematical model is updated using the output of the phase-lead compensator while the output of the integrator is provided to the driving unit.

2. The apparatus according to claim 1, wherein
   when the input to the driving unit is not saturated, the control part performs the first update mode, and
   when the input to the driving unit is saturated, the control part performs a second update mode in which the mathematical model is updated by applying the output of the integrator and the output of the phase-lead compensator to the mathematical model.

3. The apparatus according to claim 1, wherein the control part updates the mathematical model by multiplying the output of the phase-lead compensator by a fixed gain.

4. The apparatus according to claim 1, wherein the control part updates the mathematical model by multiplying the output of the phase-lead compensator by a gain varying in accordance with remaining distance to the target position of the magnetic head.

5. The apparatus according to claim 1, wherein the control part updates the mathematical model by multiplying the output of the phase-lead compensator by a gain varying in accordance with a target velocity of the magnetic head.

6. The apparatus according to claim 1, wherein the control part updates the mathematical model by multiplying the output of the phase-lead compensator by a gain varying in accordance with a model velocity of the mathematical model.

7. The apparatus according to claim 1, wherein the two-degree-of-freedom control system performs computation with a sampling period which is half a sampling period of the position error feedback control system.

8. The apparatus according to claim 1, wherein
   when a remaining distance of a seek of the magnetic head is long, the control part performs the first update mode, and
   when the remaining distance of a seek of the magnetic head becomes short, the control part provides the output of the integrator and the output of the phase-lead compensator to the driving unit.

9. A magnetic disk apparatus comprising:
   a driving unit configured to move a magnetic head operative to record and reproduce information on a magnetic disk; and
   control part configured to control the driving unit, the control part including:
- a position error feedback control system having an integrator and a phase-lead compensator and being operative to determine a position command based on a target position and a sensed position of the magnetic head, thereby performing feedback control on the driving unit;
- a two-degree-of-freedom control system configured to receive as input a target moving distance of the magnetic head and to output a current command to the driving unit by using a mathematical model of the driving unit;
- a first switch having a first state and a second state, an output of the phase-lead compensator being provided to the driving unit in the first state, and the output of the phase-lead compensator being provided to the mathematical model in the second state; and
- a second switch having a third state and a fourth state, an output of the integrator being provided to the driving unit in the third state, and the output of the integrator being provided to the mathematical model in the fourth state.

10. The apparatus according to claim 9, wherein
the control part has a first update mode and a second update mode,
in the first update mode, the control part controls the first switch to be in the second state, controls the second switch to be in the third state, and updates the mathematical model, and
in the second update mode, the control part controls the first switch to be in the second state, controls the second switch to be in the fourth state, and updates the mathematical model.

11. The apparatus according to claim 10, wherein
when the input to the driving unit is not saturated, the control part performs the first update mode, and
when the input to the driving unit is saturated, the control part performs the second update mode.

12. The apparatus according to claim 10, wherein
when a remaining distance of a seek of the magnetic head is long, the control part performs the first update mode, and
when the remaining distance of a seek of the magnetic head becomes short, the control part provides the output of the integrator and the output of the phase-lead compensator to the driving unit.

13. The apparatus according to claim 9, wherein the control part updates the mathematical model by multiplying the output of the phase-lead compensator by a fixed gain.

14. The apparatus according to claim 9, wherein the control part updates the mathematical model by multiplying the output of the phase-lead compensator by a gain varying in accordance with remaining distance to the target position of the magnetic head.

15. The apparatus according to claim 9, wherein the control part updates the mathematical model by multiplying the output of the phase-lead compensator by a gain varying in accordance with a target velocity of the magnetic head.

16. The apparatus according to claim 9, wherein the control part updates the mathematical model by multiplying the output of the phase-lead compensator by a gain varying in accordance with a model velocity of the mathematical model.

17. The apparatus according to claim 9, wherein the two-degree-of-freedom control system performs computation with a sampling period which is half a sampling period of the position error feedback control system.

18. A magnetic head control method for moving a magnetic head operative to record and reproduce information on a magnetic disk, the method comprising:
- using an integrator and a phase-lead compensator to determine a position command based on a target position and a sensed position of the magnetic head, thereby performing feedback control on a driving unit for the magnetic head;
- simultaneously, receiving as input a target moving distance of the magnetic head and using a mathematical model of the driving unit to output a current command to the driving unit, thereby controlling the driving unit; and
- updating the mathematical model,
- the method having a mode in which the mathematical model is updated using the output of the phase-lead compensator while the output of the integrator is provided to the driving unit.

19. The method according to claim 18, wherein
when the input to the driving unit is not saturated, the first update mode is performed, and
when the input to the driving unit is saturated, a second update mode is performed, in the second update mode the mathematical model is updated by applying the output of the integrator and the output of the phase-lead compensator to the mathematical model.

20. The method according to claim 18, wherein the mathematical model is updated by multiplying the output of the phase-lead compensator by a fixed gain.

* * * * *